United States Patent
Faris

[11] Patent Number: 5,805,386
[45] Date of Patent: Sep. 8, 1998

[54] DUAL MODE INDEPENDENT SUSPENSION READ/WRITE HEAD ASSEMBLIES IN A HARD DISK DRIVE

[75] Inventor: Jeffrey E. Faris, Richardson, Tex.

[73] Assignee: Texas Instruments Incorporated, Dallas, Tex.

[21] Appl. No.: 772,842

[22] Filed: Dec. 24, 1996

[51] Int. Cl.$^6$ ........................................ G11B 5/55
[52] U.S. Cl. ................................................ 360/106
[58] Field of Search ............................................ 360/106

[56] References Cited

U.S. PATENT DOCUMENTS

| | | | |
|---|---|---|---|
| 4,544,972 | 10/1985 | Kogure | 360/106 |
| 5,134,532 | 7/1992 | Svendsen | 360/106 |
| 5,293,282 | 3/1994 | Squires et al. | 360/77.08 |
| 5,343,345 | 8/1994 | Gilovich | 360/104 |
| 5,343,347 | 8/1994 | Gilovich | 360/106 |

*Primary Examiner*—A. J. Heinz
*Attorney, Agent, or Firm*—Lawrence J. Bassuk; W. James Brady; Richard L. Donaldson

[57] ABSTRACT

A disk drive system (70) and an actuator assembly (50; 150) therein are disclosed. The actuator assembly (50) includes multiple actuator arms (52; 152) that are independently rotatable about a pivot pin (26) by the operation of multiple voice coil motors (55; 155). Separate voice coil motor servo controls (94; 194) are provided to control the voice coil motors (55; 155). Voice coil motors (55; 155) may be dedicated to individual actuator arms (52), or alternatively to multiple actuator arms (152) that are connected together. Separate bearings (54; 154) are provided in the actuator assembly (50; 150). The construction of the actuator assembly (50; 150) permits simultaneous read/write access via multiple data channel control circuits (92) associated with individual read/write heads (14). In addition, positioning of an actuator arm (52; 152) during read/write access through a head (14) associated with a different arm (52; 152) is enabled

21 Claims, 6 Drawing Sheets

DUAL MODE INDEPENDENT SUSPENSION READ/WRITE HEAD ASSEMBLIES IN A HARD DISK DRIVE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of mass storage devices in computer systems, and is more specifically directed to actuators in hard disk drives of personal computers.

Fixed magnetic disk systems, typically referred to as "hard" disk drives, are now commonplace as the main non-volatile storage in modern personal computers, workstations, and portable computers. Such hard disk drives are now capable of storing gigabyte quantities of digital data, even when implemented in portable computers of the so-called "notebook" class. Many important advances have been made in recent years that have enabled higher data density and thus larger storage capacities of hard disk drives, and that have also enabled much faster access speeds, both in the bandwidth of data communicated to and from the hard disk drive, and also in the access time of specified disk sectors. Advances have also been made that have greatly reduced the size and weight of hard disk drives, particularly as applied to portable computers, have been made over recent years. These advances have resulted in the widespread availability of portable computers weighing below five pounds, yet having state-of-the art capability and performance.

Referring to FIG. 1, conventional hard disk drive system 2 will now be described, by way of background. Hard disk drive system 2 is contained within rectangular case 4 which provides structural support, EMI shielding, and contaminant protection for disk drive system 2 when its top cover is included (the top cover not shown in FIG. 1). Within case 4 are some of the drive electronics 6 (shown in shadow) for signal amplification, and multiple disks 8 (only one of which is visible in the plan view of FIG. 1) that are coated with magnetically sensitive material and upon which data is stored at locally magnetized regions. In this example of a conventional disk drive, two disks 8 are utilized and are rotated by common spindle 10, which is driven by a spindle motor (not shown). Multiple actuator arms 12 (only one of which is visible in FIG. 1), each having a read/write head 14 mounted thereupon that travels in close proximity to a surface of one of disks 8, are positionable at varying radial distances of disks 8 by operation of conventional voice coil motor 15. The position of actuator arms 12 will, of course, control the location of the corresponding read/write heads 14. Typically, multiple actuator arms 12 are interleaved among the multiple disks 8 in disk drive system 2, as will be described hereinbelow relative to FIG. 3.

Voice coil motor 15, according to this conventional configuration, is a motor for positioning actuator arms 12 at the desired radial distance of disks 8. Referring now to FIGS. 1 and 2 in combination, the construction of a conventional voice coil motor 15 will now be described. As shown in FIGS. 1 and 2, voice coil motor 15 pivots about a rotating bearing cartridge 24 that bears upon pivot pin 26. Rotatable "E-block" 16, from which actuator arms 12 extend, is attached to bearing cartridge 24. Bracket 17 is also attached to E-block 16, for supporting voice coil 20. Voice coil 20 is a coil of multiple turns of wire, typically as 135 to 150 turns of small-gauge copper wire for a 65 mm disk, arranged in a quasi-trapezoidal form and supported by bracket 17 over permanent magnet 18. Magnet 18 is typically a surface-magnetized permanent magnet, magnetized to have poles at either end thereof as indicated in FIG. 2; the bottom surface of magnet 18 is also magnetized to the opposite polarity, to generate magnetic flux normally from the surface of magnet 18. Shield 22 (illustrated in shadow in FIG. 2) overlies coil 20 30 and magnet 18 to confine the magnetic field generated by magnet 18; in place of shield 22, some conventional voice coil motors provide a second permanent magnet above voice coil 20, of similar size as magnet 18. As illustrated in FIG. 2, by way of example, with magnet 18 magnetized as shown, a current conducted by coil 20 in the counter-clockwise direction will generate a clockwise torque of voice coil motor 15 and actuator arms about its pivoting axis.

FIG. 3 illustrates the arrangement of actuator arms 12 relative to disks 8 in the in combination with FIG. 2, in a cross-sectional view. In this example, three actuator arms $12_0$ through $12_2$ extend from E-block 16 on the opposing side from coil bracket 17 (which, as shown in FIG. 2, supports coil 20 above magnet 18 and below shield 22). Flexure $13_0$ is attached to the underside of the distal end of actuator arm $12_0$ from pivot pin 26, and has read/write head $14_0$ attached to its distal end. Flexures $13_1$, $13_2$ are attached to the opposing sides of the distal end of actuator arm $12_1$, and have read/write heads $14_1$, $14_2$, respectively, attached thereto. Similarly, flexure $13_3$ is attached to the top side of the distal end of actuator arm $12_2$ and has read/write head $14_3$ attached thereto. Attachment of flexures 13 to the top and bottom sides of actuator arms 12 in each case may be reversed (e.g., flexure $13_0$ may be attached to the top side of actuator arm $12_0$), if desired for the particular vertical pitch of disks 8. In the conventional manner, read/write heads $14_0$, $14_1$ are maintained proximate the top and bottom surfaces of upper disk $8_0$, respectively, and read/write heads $14_2$, $14_3$ are maintained proximate the top and bottom surfaces of lower disk $8_1$, respectively, by negative pressure between slider portions of heads 14 and the corresponding surfaces of rotating disks 8.

As illustrated in FIG. 3, actuator arms $12_0$ through $12_3$ are formed (or attached, as the case may be) in a unitary manner with E-block 16, and are under the control of single voice coil motor 15. Because of this construction, heads 14 are in a fixed relationship with one another, typically at the same radial position of disks 8, and thus move together in a fixed relationship. As a result, conventional disk drive systems typically multiplex the read and write operations performed by the multiple heads 14, as will be described below.

FIG. 4 illustrates a block diagram of a conventional personal computer system, including CPU 30, main memory (RAM) 32, and interface adapter 34, all connected to system bus SBUS. Interface adapter 34 is a conventional interface card for controlling the communication of data and control signals between system bus SBUS and interface bus IBUS. Interface IBUS is a communications bus between interface adapter 34 and disk drive controller 36, and typically is arranged and operated according to a well-known standard such as IDE, SCSI, and the like. Disk drive controller 36 is typically implemented at least in part, if not in whole, within disk drive 2.

Disk drive controller 36 includes at least three conventional functions. A first function is to control the rotation of disks 8 by controlling spindle motor 45. In the conventional system of FIG. 4, this control is accomplished by spindle servo control system 44, which is controlled by microcontroller 40 according to signals received over interface bus IBUS and communicated by data path controller 38. Read-only memory (ROM) 41 is provided to store the program under which microcontroller 40 operates.

A second function of disk drive controller 36 is to control the operation of voice coil motor 15 to position heads 14 at the appropriate radial location of disks 8. In this conventional disk drive controller 36, this control is effected by VCM servo control system 42 which drives voice coil motor 15 in response to signals microcontroller 40, and also in response to feedback signals from heads 14 or voice coil motor 15 itself regarding their position. Data path controller 38 typically includes buffer circuitry and interface control circuitry for receiving signals from CPU 30, via interface adapter 34, requesting a read or write to a particular sector of one of disks 8. The sector signals are applied to microcontroller 40, which issues signals to VCM servo control system 42 and spindle servo control system 44 to coordinate the placement of heads 14 and the rotation of disks 8 to effect the access.

A third function of disk drive controller 36 is the communication of data to and from disks 8. This is accomplished by circuitry in data path controller 38 for transmitting and receiving data to and from heads 14 and interface adapter 34. This circuitry typically includes a sequencer or formatter, which communicates with an encoder or decoder (endec) that, for write cycles, is directly in communication with preamp 46. For example, according to one conventional approach, read information is received from preamp 46, and converted to digital signals by way of a pulse detector and filter combination, synchronized by a phase-locked loop circuit, and applied to the encoder/decoder. Preamp 46 is a conventional analog preamplifier circuit for communicating signals to and from heads 14; in this example, as is conventional in the art, preamp 46 either includes or cooperates with multiplexer 47, to direct or receive data signals from a selected one of heads 14. Of course, other circuitry and methods for communicating data to and from read/write heads in a disk drive are also well known in the art.

The conventional disk drive system 2 of FIGS. 1 through 4 operates only one of heads 14 at any one time. In order to minimize access times, where multiple disks 8 are utilized, heads 14 are operated sequentially at the same radial position or track, each of heads 14 reading or writing its particular information, before voice coil motor 15 moves actuator arms 12 to place heads 14 at a different track. An example of typical operation is as follows:

| Head | Interval 1 | Interval 2 | Interval 3 | Interval 4 | Interval 5 | Interval 6 |
|---|---|---|---|---|---|---|
| $14_0$ | RD/WR | — | — | — | MOVE | RD/WR |
| $14_1$ | — | RD/WR | — | — | MOVE | — |
| $14_2$ | — | — | RD/WR | — | MOVE | — |
| $14_3$ | — | — | — | RD/WR | MOVE | — |

The intervals indicated in this table refer to sequential intervals of time that may or may not be equal in length. In this example, once voice coil motor 15 has positioned heads 14 at the appropriate track, or radial position, multiplexer 47 selects head $14_0$, which performs a read or write to the top surface of disk $8_0$; all other heads $14_1$ through $14_3$ are deselected in this interval. In successive intervals 2 through 4, multiplexer 47 selects heads $14_1$ through $14_3$, respectively, to similarly perform reads or writes from locations on their opposing disk surfaces as instructed. During intervals 1 through 4, however, voice coil motor 15 does not reposition heads 14, and as such all of the read/write operations performed by heads $14_0$ through $14_3$ in intervals 1 through 4, respectively, are made from the same radial position of disks $8_0$, $8_1$.

In interval 5, voice coil motor 15, under the control of VCM servo control system 42, moves heads 14 to the radial position of the next track of disks $8_0$ and $8_1$ to be accessed. Because all of heads 14 are moving at the same time, no read or write operations are permitted during this interval. The distance traveled by heads 14 in interval 5 may vary widely, from merely incrementing to an adjacent trace in the best case to traveling the full radius of the disk in the worst case. Disk access times are typically measured by assuming a travel of one-third of the radius of disks 8. Once the move operation of interval 5 is performed, the read/write sequence may begin again, with access by head $14_0$ in interval 6.

In the conventional disk drive systems 2, therefore, multiple heads 14 are provided so that access may be made to any one of the 2N surfaces of N stacked disks in the drive (N=2 in the example shown). However, only one of the heads 14 is operable at any one time, given the nature of the electronic control and the common track positioning of heads 14 in a fixed relationship to one another. Furthermore, a disk "crash" upon any of the surfaces of disks 8 (e.g., failure of one of heads 1, damage to the surface of one of disks 8, or an electronic failure) typically affects the operation of all heads 14, causing at least temporary loss of data from all surfaces of disks 8.

By way of further background, U.S. Pat. Nos. 5,343,345, 5,343,347 disclose hard disk drives having multiple actuator arms positioned at different sides of the disk. The multiple actuator arms access opposing disk surfaces from one another at different locations, reducing the spacing required between vertically spaced multiple disks. The hard disk drive module is enlarged to accommodate the multiple actuator arms and voice coil motors, as evident from the references.

By way of further background, U.S. Pat. No. 5,293,282 discloses a hard disk drive with multiple actuator arms, disposed diagonally opposite one another. This reference discloses that the multiple access arms reduce the access time to a particular location of the disks, by reducing the latency time from one-half of a disk revolution to one-fourth of a disk revolution. The disclosed control circuitry accomplishes this by selecting the one of the actuators that is nearer a particular sector of a particular track.

BRIEF SUMMARY OF THE INVENTION

It is an object of the present invention to provide a hard disk drive in which simultaneous read/write access to different disk surfaces may be performed.

It is a further object of the present invention to provide such a hard disk drive in which simultaneous read/write access to different tracks of different disk surfaces may be performed.

It is a further object of the present invention to provide such a hard disk drive that may be implemented within a conventional size disk drive module case.

It is a further object of the present invention to provide such a hard disk drive in which, when operating according to a low-power mode, the access time is reduced relative from that of conventional disk drives.

It is a further object of the present invention to provide such a hard disk drive in which failure of one head or disk surface does not incapacitate the operation of other heads and disk surfaces.

Other objects and advantages of the present invention will be apparent to those of ordinary skill in the art having reference to the following specification together with its drawings.

The present invention may be implemented into a hard disk drive system and methods of operating the same in which a plurality of actuator arms pivot about a common pivot pin, and independently position one or more read/write heads at a desired disk track. A plurality of voice coil motors, and associated control circuitry are provided to position the actuator arm and head assemblies; data communication circuitry may also be dedicated to the plurality of heads. The disk drive system may be operated in a high performance mode, in which multiple ones of the heads may be simultaneously accessing different ones of multiple disk surfaces, at different radial positions or tracks; such a mode is particularly beneficial in multimedia systems to access data of different types. In a low-power mode, where only one of the multiple heads is active at any particular time, others of the actuators may position their heads at other tracks during access from one of the heads; in this mode, therefore, the access time of the drive is reduced from conventional systems.

DETAILED DESCRIPTION OF THE INVENTION

Figure 5:
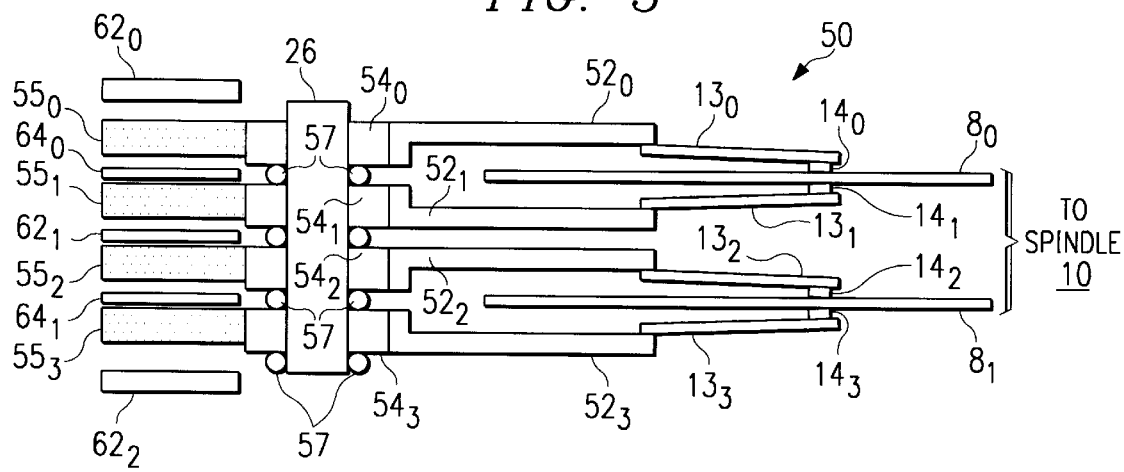
FIG. 5 is an elevation cross-sectional view of an actuator assembly according to a first embodiment of the invention.
Figure 6:
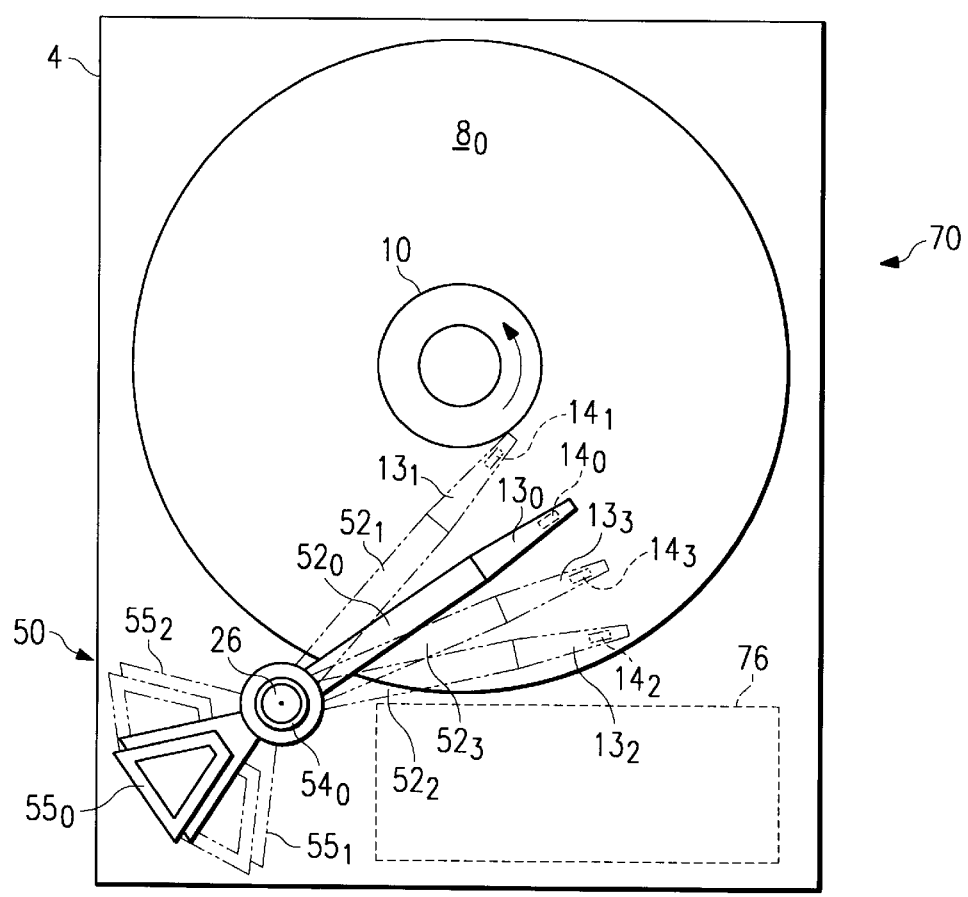
FIG. 6 is a schematic plan view of a voice coil motor in the disk drive system according to the first embodiment of the invention.

Referring now to FIGS. 5 and 6, actuator assembly 50 according to a first preferred embodiment of the invention will now be described. Similar elements to those described hereinabove will be referred to by like reference numerals.

As illustrated in FIG. 5, actuator assembly 50 includes four actuator arms $52_0$ through $52_3$ which, according to this embodiment of the invention, are separately and independently rotatable about the longitudinal axis of pivot pin 26. Each of actuator arms 52 have a flexure 13 extending from its distal end, upon which a read/write head 14 is mounted in the conventional manner. According to this embodiment of the invention, flexure $13_0$ is mounted to the underside of actuator arm $52_0$, and has read/write head $14_0$ mounted thereto, and flexure $13_1$, is mounted to the topside of actuator arm $52_1$, with read/write head $14_1$ mounted thereto; read/write heads $14_0$, $14_1$ are disposed proximate top and bottom surfaces of disk $8_0$, respectively. Similarly, read/write head $14_2$ is mounted to flexure $13_2$, which in turn is mounted to the underside of actuator arm $52_2$, and read/write head $14_3$ is mounted to flexure $13_3$, which is mounted to the top side of actuator arm $52_3$; read/write heads $14_2$, $14_3$ are disposed proximate top and bottom surfaces of disk $8_1$, respectively.

According to this embodiment of the invention, actuator arms $52_0$ through $52_3$ are associated with bearings $54_0$ through $54_3$, respectively. Bearings 54 are preferably implemented as ball bearing cartridges, having a plurality of ball bearings (not shown) in contact with pivot pin 26 and maintained within dedicated inner and outer races. Bearings 54 are each placed and maintained in the proper vertical position along pivot pin 26 by external retaining rings 57. Because of the separated construction of bearings $54_0$ through $54_3$, actuator arms $52_0$ through $52_3$ are separately rotatable about pivot pin 26. In this example, pivot pin 26 is fixably mounted within the disk drive case, in the conventional manner, such that actuator arms 52 freely rotate (with the outer race of bearings 54) relative to pivot pin 26; alternatively, other arrangements in which independent pivot pins 26 are provided for each actuator arm, with the outer race of dedicated bearing 54 fixed in position and the inner race and pivot pin 26 rotating with its actuator arm 52 about a common longitudinal axis of multiple pivot pins 26, are also contemplated.

Each of actuator arms $52_0$ through $52_3$ has a separate voice coil motor $55_0$ through $55_3$ attached thereto, on the side of pivot pin 26 opposing flexures $13_0$ through $13_3$. Voice coil motors 55 are preferably constructed in the conventional manner. For example, voice coil motors 55 may be constructed similarly as in the conventional disk drive system 2 described hereinabove, with a bracket extending from actuator arms 52 and a coil of many turns of wire attached thereto. While the construction of voice coil motors 55 is qualitatively similar to conventional voice coil motors, it is contemplated that the size of each voice coil motor 55, particularly in its vertical height and in the number of turns, will be substantially smaller than a conventional voice coil motor, so as to fit within the vertical pitch of the associated actuator arms 52. It is contemplated that this reduction in size will not hamper the operation of actuator assembly 50, as the mass and moment of inertia of an individual actuator arm 52 is significantly less (e.g., by a factor on the order of 1/2N , where N is the number of disks 8) than the overall mass and moment of inertia of a conventional E-block 16 with all actuator arms 12, such as described above. The torque required of smaller voice coil motors 55 is thus reduced from that of conventional voice coil motors, permitting voice coil motors 55 to be reduced in size so as to fit within the vertical pitch of actuator arms 52.

As illustrated in the elevation view of FIG. 5, voice coil motors $55_0$ through $55_3$ are separately disposed above one another in the vertical direction, with magnetic elements 62, 64 disposed therebetween. In the example of this first embodiment of the invention illustrated in FIG. 5, magnets 62 are each permanent magnets, preferably surface magnetized in the conventional manner, while shields 64 are each formed of a ferromagnetic steel. Each of magnets 62 and shields 64 are fixably mounted within the case of the disk drive, by conventional brackets (not shown for purposes of clarity). As illustrated in FIG. 5, magnet $62_0$ is disposed above voice coil motor $55_0$, magnet $62_1$ is disposed between voice coil motors $55_1$, $55_2$, and magnet $62_2$ is disposed below voice coil motor $55_3$. Adjacent ones of voice coil motors 55 are preferably counterwound relative to one another, as their magnetic fields will be of opposite polarity. Magnet $62_1$ is preferably surface magnetized on both of its sides (with opposite polarity), as it is disposed between two voice coil motors $55_1$, $55_2$. Shield $64_0$ is disposed between voice coil motors $55_0$ and $55_1$, while shield $64_1$ is disposed between voice coil motors $55_2$ and $55_3$. According to this construction, each of voice coil motors 55 are within a magnetic field generated by a permanent magnet, and as such, when energized by a current, will operate to rotate its actuator arm 52 (with flexure 13 and head 14) about pivot pin 26. This rotation moves its associated read/write head 14 along radial positions, or tracks, of the associated surface of disk 8.

Alternatively, actuator assembly 50 may be constructed so as to have a magnet between each pair of voice coil motors 55. According to this alternative construction, shields $64_0$, $64_1$ would each be replaced by permanent magnets, preferably surface magnetized on both surfaces (to opposite polarity). Each voice coil motor 55 according to this embodiment of the invention would therefore be disposed between two magnets. The polarities of the permanent magnets for each voice coil motor 55 must, of course, be arranged so as to cooperate in generation of the magnetic field; as such, the surfaces of the opposing magnets would be of opposite magnetic polarity to generate a vertical magnetic field in the gap therebetween. The magnetic field presented to each of voice coil motors 55 is potentially increased according to this alternative embodiment of the invention, as the number of magnets exerting a field for each voice coil motor 55 is doubled. A stronger magnetic field reduces the current conducted by, and number of turns in, each voice coil motor 55 to achieve the required torque.

Figure 1:
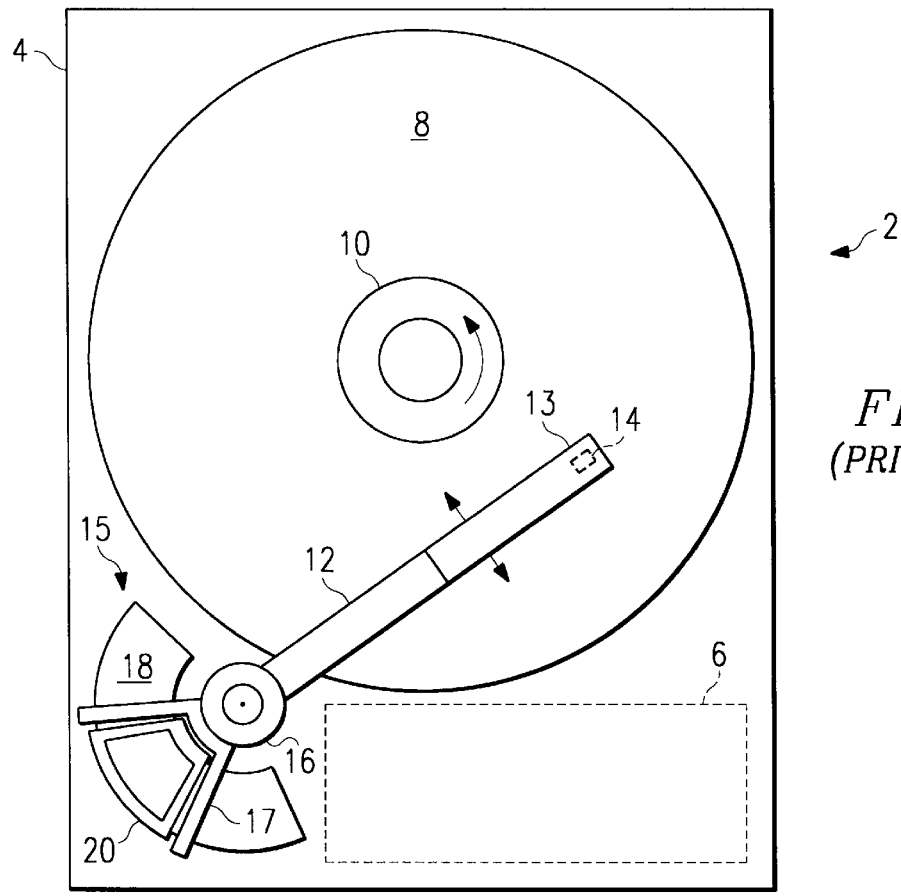
FIG. 1 is a schematic plan view of a disk drive system according to the prior art.
Figure 2:
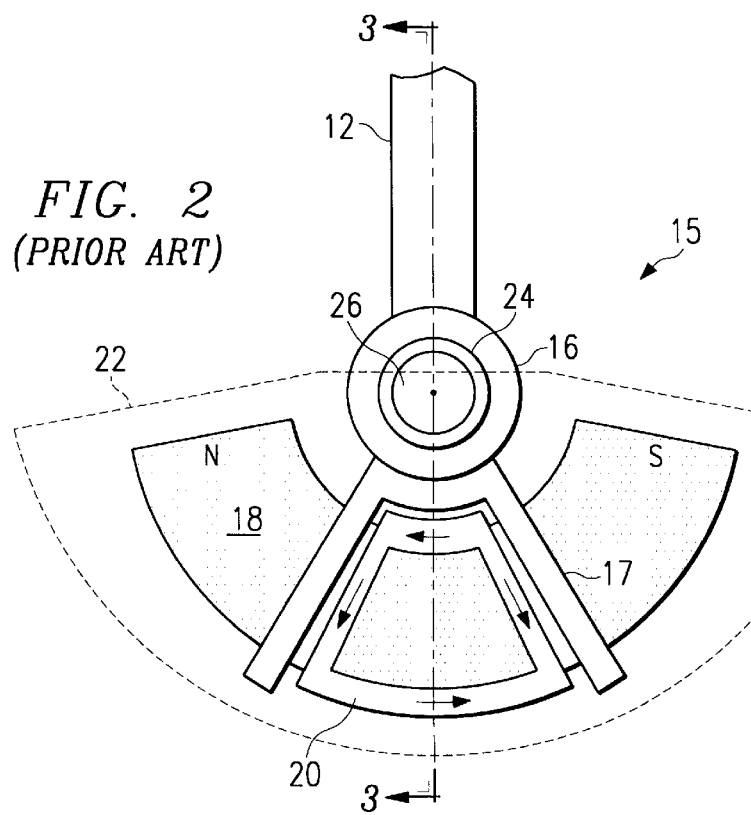
FIG. 2 is a schematic plan view of a voice coil motor in the disk drive system of FIG. 1 according to the prior art.
Figure 3:
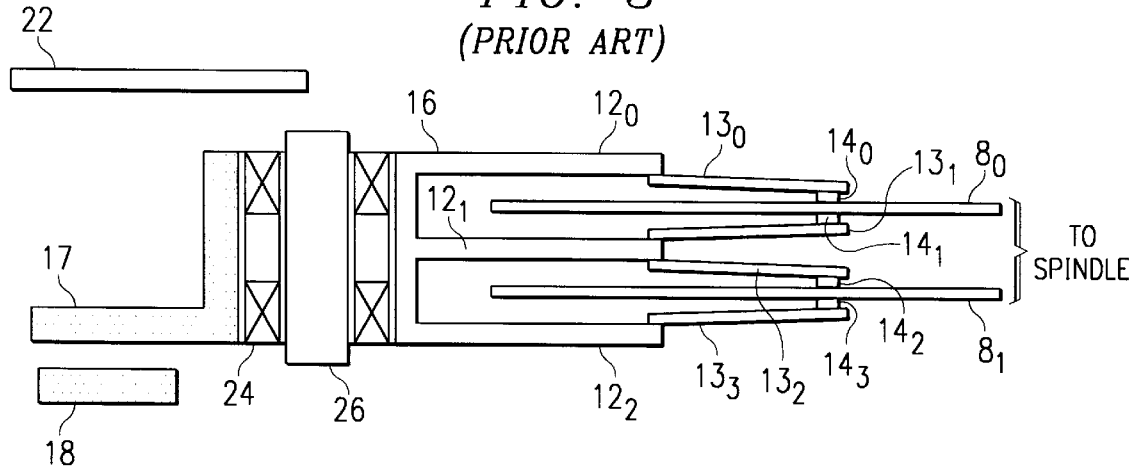
FIG. 3 is an elevation cross-sectional view of the actuator arms and disks in the disk drive system of FIG. 1 according to the prior art.

FIG. 6 illustrates, in plan view, actuator assembly 50 according to this first embodiment of the invention, as in place in disk drive system 70. Disk drive system 70 includes case 4 as before, with disks 8 (only the top surface of upper disk $8_0$ visible in FIG. 6) rotating about spindle 10. Disks 8 are of suitable size for use in a personal computer; in modern computers, this size will typically be 3½ inches in diameter, although the present invention is applicable to larger (e.g., 5¼ inches) and smaller disk sizes (e.g., 2½ inches for notebook computers). Actuator assembly 50, constructed as described hereinabove relative to FIG. 5, is disposed within approximately the same area as the conventional actuator assembly described hereinabove relative to FIG. 1, considering that the distance of travel of the associated voice coil motors and actuator arms are similar. The present invention thus provides improved functionality and performance in disk access without requiring expansion of the form factor of case 4 or the addition of redundant actuators, and without significant additional weight. As such, the present invention is particularly suitable for use in portable computing devices, such as notebook computers.

As illustrated in FIG. 6, separate voice coil motors $55_0$ through $55_3$ (voice coil motor $55_3$ not visible in FIG. 6 due to its position below voice coil motors $55_0$ through $55_2$) are operable to separately and independently position actuator arms $52_0$ through $52_3$, respectively, and thus their respective read/write heads $14_0$ through $14_3$, at desired radial positions or tracks of disks 8. Magnets 62 and shields 64 are not shown in FIG. 6, for purposes of clarity, but are of course present in disk drive system 70, mounted within case 4 so as to be interleaved among voice coil motors 55 as illustrated in the elevation view of FIG. 5. In FIG. 6, actuator arms $52_1$ through $52_3$, and their respective flexures $13_1$ through $13_3$ and read/write heads $14_1$ through $14_3$, are illustrated in shadow as they are located below one or more of disks $8_0$, $8_1$.

Figure 7A:
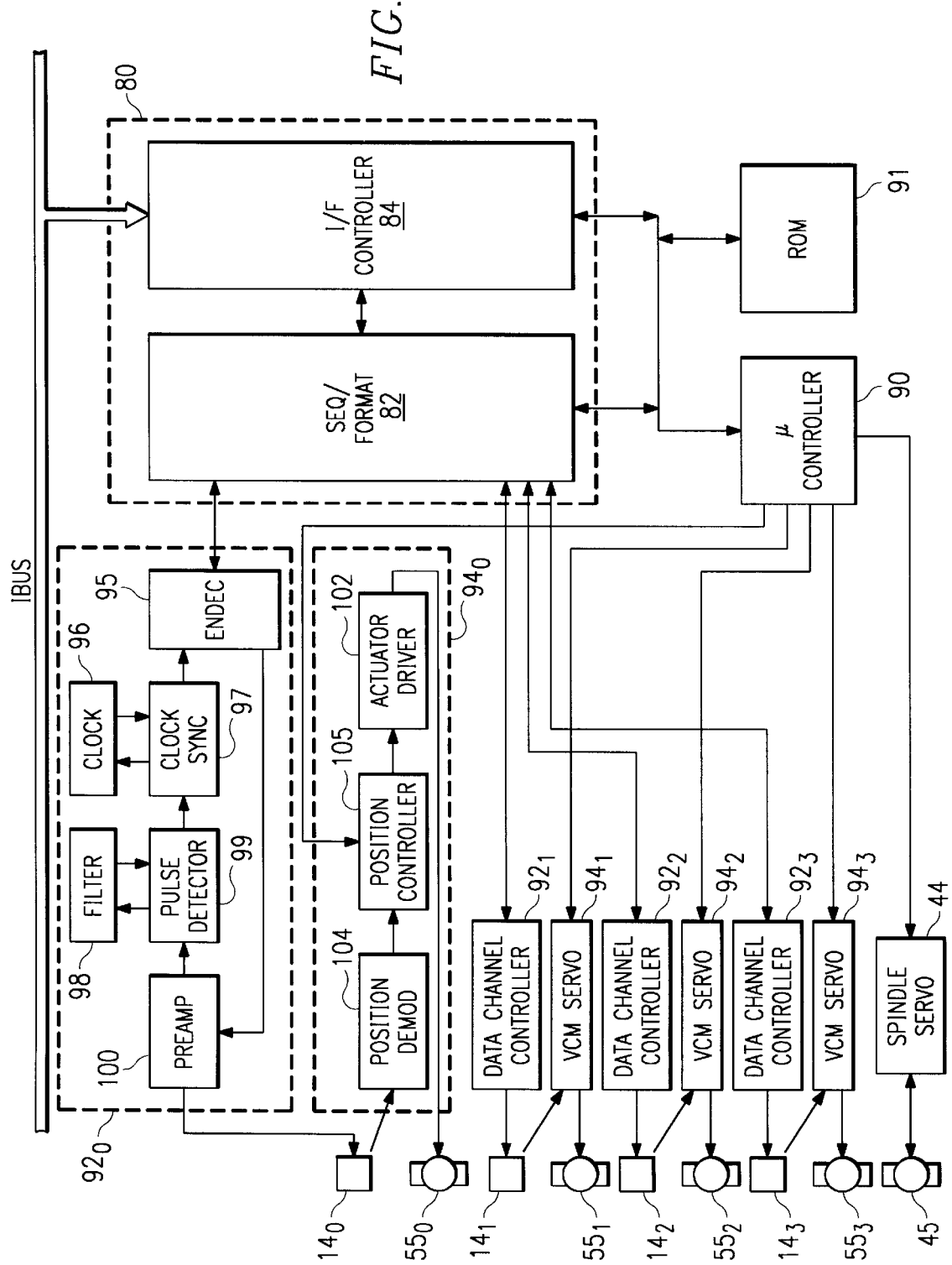
FIG. 7a is an electrical diagram, in block form, of a first implementation of data communications and drive control circuitry for the disk drive system according to the first embodiment of the invention.

As shown in FIG. 6, drive electronics 76 are similarly contained within case 4 as before, with substantially the same form factor. Referring now to FIG. 7a, the construction and operation of circuitry used in operation of actuator assembly 50 according to the first preferred embodiment of the invention will now be described. It is contemplated that some, if not all, of the circuitry of FIG. 7a may be included within drive electronics 76 of disk drive system 70 shown in FIG. 6; to the extent that portions of this circuitry are not included within case 4, particularly those portions of the circuitry nearer to internal bus IBUS, such circuitry is preferably implemented onto a disk drive controller card that is integral to the disk drive, as conventional for personal computer disk drive systems.

As illustrated in FIG. 7a, interface bus IBUS is coupled to interface circuitry 80. Interface bus IBUS is an internal computer system bus for communication to peripherals such as disk drive controllers, as described above relative to FIG. 4, and is preferably arranged and operated according to a conventional disk drive standard, such as IDE, SCSI, and the like. Accordingly, an interface adapter (not shown) will be connected to interface bus IBUS and to a system bus, for communication of data between system bus elements (such as the system CPU and main memory) and disk drive system 70 in the conventional manner, as described hereinabove relative to FIG. 4. As will become apparent from the following description, however, the disk drive access provided by the present invention may be at much higher speeds than conventional disk drive access, as simultaneous communication to and from different disk sectors is enabled by the present invention. To accommodate such high speed disk communication, particularly where multiple "channels" of data are to be simultaneously communicated, interface bus IBUS is preferably a high speed bus, such as of the IEEE 1394 standard known in the art.

Interface circuitry 80 is constructed according to the conventional manner for performing the interface of disk drive control circuitry to internal bus IBUS. Functions included within interface circuitry 80 therefore likely include interface control circuit 84, which is coupled to internal bus IBUS and which performs transceiver functions relative to internal bus IBUS to effect data communication between disk drive system 70 and internal bus IBUS. Interface circuitry 80 also includes sequencer/formatter 82 which performs conventional sequence and formatting functions for disk drive signals for preparation of the signals to be communicated by transceivers in interface control circuit 84 to and from internal bus IBUS; according to this embodiment of the invention, however, sequencer/formatter 82 is capable of receiving and sending four channels of data simultaneously to and from data channel controller circuits $92_0$ through $92_3$ associated with read/write heads $14_0$ through $14_3$. Typical functions performed by sequencer/formatter 82 include the reading of the ID fields of sectors to identify the desired sector, providing timing and sequencing signals for reads and writes of disk sectors, generating the ID fields of sectors during disk formatting, and performing error correction coding (ECC).

Figure 4:
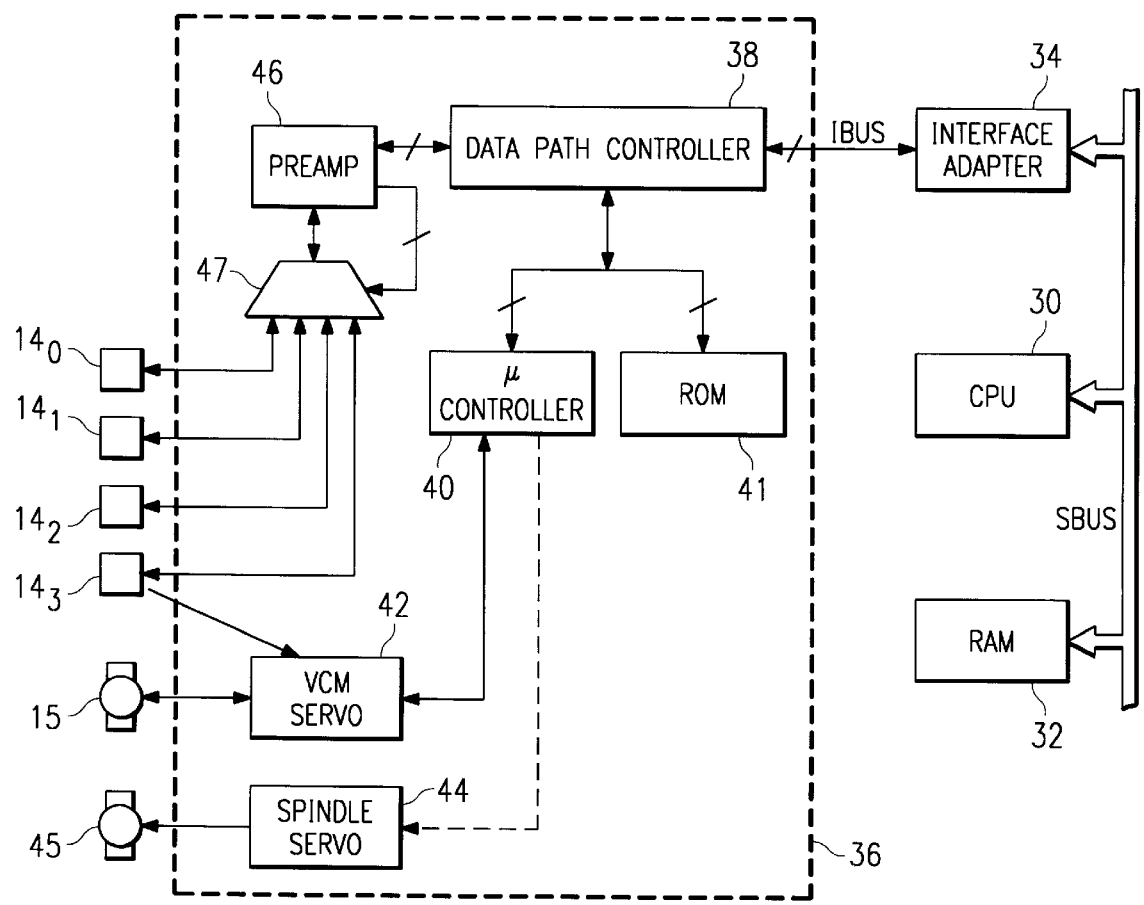
FIG. 4 is an electrical diagram, in block form, of the data communications and control circuitry for the disk drive system of FIG. 1 according to the prior art.

Data channel controller circuits $92_0$ through $92_3$ include conventional disk drive read/write channel circuitry, for example as described hereinabove relative to FIG. 4; according to this embodiment of the invention, however, four such channels are provided, rather than the single data path controller 38 and preamp 46 (with multiplexer 47) shown in FIG. 4. The construction and operation of data channel controller circuit $92_0$ for read/write head $14_0$ will now be described in detail, it being understood that the other data channel controller circuits $92_1$ through $92_3$ will be similarly constructed.

Data channel controller circuit $92_0$ includes encoder/decoder ("endec") 95, which is in communication with sequencer/formatter 82 of interface circuitry 80. Endec 95 is a conventional encoder/decoder circuit, as used to encode digital data communicated by interface circuitry 80 into a coded serial stream (such as Run Length Limited Coding) for writing to disk, and to decode serial streams of disk data into digital data. For the write path (i.e., communication of data from internal bus IBUS to disk 8), endec 95 is connected to preamplifier ("preamp") 100, which in turn is connected in bidirectional fashion to read/write head $14_0$. Preamp 100 may be implemented in the conventional manner for disk drive preamplifiers, for example such as the VM312HH preamplifier available from VTC Inc., except that the selection or multiplexer function of such a preamplifier need not be utilized, considering that preamp 100 in data channel controller circuit $92_0$ is associated only with read/write head $14_0$. In a write to disk operation, preamp 100 thus receives the encoded data stream from endec 95 and generates output current levels for application to read/write head $14_1$, to effect a write to the selected track of the upper surface of disk $8_0$, in the conventional manner for disk write operations.

On the read side of data channel controller circuit $92_0$, preamp 100 receives input signals from read/write head $14_0$ in the conventional manner corresponding to the locally magnetized locations on disk $8_0$. Preamp 100 amplifies these input pulses and applies the amplified pulses to pulse detector 99, which operates in combination with filter 98 to present a data stream to clock synchronization circuitry 97. Clock synchronization circuitry 97, which may be implemented as a conventional phase-locked loop circuit, operates in combination with clock generator 96 to generate a synchronous data stream to endec 95. In the read mode, endec 95 decodes the synchronized data stream from clock synchronization circuit 97, and applies the decoded digital data to sequencer/formatter 82 of interface circuitry 80, for communication to internal bus IBUS.

The realization of multiple data channel controller circuits $92_0$ through $92_3$ in one or more integrated circuits will depend upon the technology available and the particular requirements of the disk drive design. Of course, each of data channel controller circuits 92 may be implemented by in a discrete manner relative to one another by simply replicating conventional circuits. Given the similarities in operation of data channel controller circuits 92, however, it is contemplated that efficiency may be improved by integrating some or all of the functions of data channel controller circuits 92 into the same integrated circuit For example, preamps 100 in data channel controller circuits $92_0$ through $92_3$ may all be integrated into a single integrated circuit, despite their independent communication with their associated read/write heads $14_0$ through $14_3$, respectively. It is contemplated that the particular integration of the functions of data channel controller circuits $92_0$ through $92_3$ may be readily effected by one of ordinary skill in the art having reference to this specification.

Figure 7B:
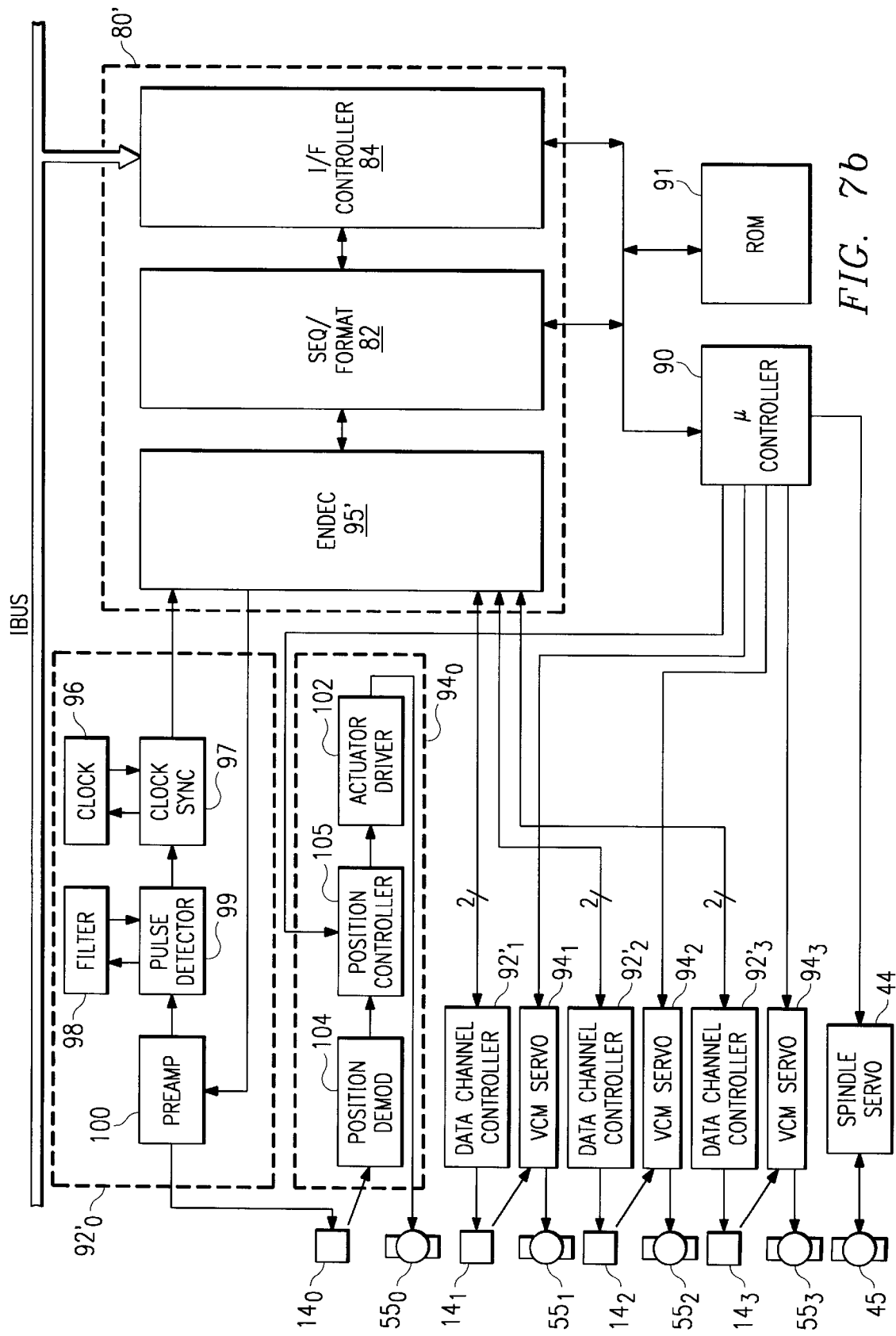
FIG. 7b is an electrical diagram, in block form, of a second implementation of data communications and drive control circuitry for the disk drive system according to the first embodiment of the invention.

FIG. 7b illustrates an alternative implementation of interface circuitry 80' and data channel controller circuits 92'. In this example, shared endec 95' is included within interface circuitry 80', and is shared by all four data channel controller circuits 92' by way of bidirectional coupling (i.e., preferably by separate read and write lines as illustrated for the case of data channel controller circuit $92_0$ '). Endec 95' in this example operates at sufficient speed to encode and decode the respective data streams from data channel controller circuits 92', even where simultaneous communication is undertaken. In this way, the hardware requirements are reduced from the example of FIG. 7a, as one shared endec 95' is able to replace four dedicated endecs 95 (FIG. 7a).

It is contemplated that other alternative arrangements will be apparent to those of ordinary skill in the art having reference to this specification. In general, it is contemplated that the boundary between circuitry that is dedicated to individual read/write heads, and circuitry that is shared by all read/write heads, will typically be located at such point where one or more high speed components are able to support the operation of the multiple data channels. This boundary may be at any point between the preamp and the interface bus, depending upon the particular architecture.

As described hereinabove, each read/write head 14 is at the distal end of an actuator arm 52 and flexure 13 combination, which is positioned by its own individual voice coil motor 55. According to this first preferred embodiment of the invention, and referring back to FIG. 7a by way of reference (the implementation of FIG. 7b being similar in this respect), each voice coil motor $55_0$ through $55_3$ is controlled by its own VCM servo control $94_0$ through $94_3$, respectively.

As shown in FIG. 7a, microcontroller 90, and its associated program ROM 91, are both connected to an output bus of interface circuit 80, to receive information from the operating system of the computer, via internal bus IBUS, regarding the tracks (i.e., the radial positions of disk 8) at which the various heads $-_0$ through $14_3$ are to be positioned to accomplish the desired read or write operation. Microcontroller 90 is also connected to spindle servo control 44 to control the operation of spindle motor 45, in the conventional manner. Microcontroller 90 may be implemented as any conventional microcontroller as used in disk drive systems, except that it drives four VCM servo controls 94 (rather than a single such control in conventional systems). Considering the relatively slow speeds of operation of VCM servo controls 94 and the positioning operation, as compared with the internal operational frequency of conventional microcontrollers, it is contemplated that a single microcontroller 90 implemented according to modem technology will be capable of communicating signals to all four of VCM servo controls $94_0$ through $94_3$ to the extent that simultaneous control may be effected. Alternatively, multiple limited capacity microcontrollers 90 may be provided, each driving one or two VCM servo controls $94_0$ through $94_3$, if desired.

FIG. 7a illustrates the construction of VCM servo control $94_0$ by way of example; of course, VCM servo controls $94_1$ through $94_3$ will be similarly constructed. In the example of FIG. 7a, VCM servo control $94_0$ is constructed according to the conventional manner for voice coil motor control systems. Position controller 105 receives an input signal from microcontroller 90, and also a feedback signal from head 14$_0$ or from voice coil motor 55$_0$ that is communicated via position demodulator 104. Based upon the difference between the input signal from microcontroller 90 corresponding to the desired position of head 14$_0$ and the feedback signal corresponding to the actual position of voice coil motor 55$_0$ and head 14$_0$, position controller 105 generates a signal to actuator driver 102 that applies a drive current of the desired magnitude, polarity, and duration, to voice coil motor 55. The particular circuitry for implementing VCM servo control 94$_0$ is known in the art; according to this embodiment of the invention, however, each of the multiple voice coil motors 55 are independently controlled by its own dedicated VCM servo control 94. Separate and independent positioning of each of read/write heads 14 at a desired track of disks 8, as shown in FIG. 6 by way of example, may therefore be accomplished according to this first preferred embodiment of the invention.

In operation, disk drive system 70 may operate in a high performance mode, and also in a low-power mode. In its high performance mode, multiple ones of read/write heads 14 may be operating at any one time, simultaneously with the movement of others of heads 14 to different tracks. It is contemplated that reads and writes may be simultaneously performed to different tracks by different ones of heads 14; for example, read/write head 14$_0$ may be performing a read from a first track of the top surface of disk 8$_0$ simultaneously with read/write head 14$_2$ performing a write to a different track of the top surface of disk 8$_1$, with each of voice coil motors 55$_1$, 55$_2$ moving their associated read/write heads 14$_1$, 14$_3$ to different tracks. It is therefore contemplated that extremely high rates of data communication to and from disks 8 may be accomplished according to the preferred embodiment of the invention.

In typical personal computers, it may not always be useful to simultaneously access similar types of data from different locations on different disks. For example, if the system CPU is performing a numerical calculation within a conventional program, it is highly unlikely that accesses of numerical data for this calculation will often be made simultaneously to different portions of disk space so as to utilize the multiple independently positionable read/write heads 14 of the preferred embodiment of the invention.

Accordingly, it may be preferable in many applications to utilize different surfaces of disks 8 for different functions, such that simultaneous operation may provide significant system performance benefit. For example, both surfaces of disk 8$_0$ may be dedicated to numerical data, while the top surface of disk 8$_1$, may be dedicated to multimedia information such as video, and the bottom surface of disk 8$_1$, may be dedicated to audio multimedia information. In such an arrangement, write access to the top surface of disk 8$_0$ may be made via read/write head 14$_0$ simultaneously with a read access to the bottom surface of disk 8$_0$ via read/write head 14$_1$ (for example, to perform a DMA operation relative to main memory); these actions may be carried out simultaneously with reads of the top and bottom surfaces of disk 8$_1$ via read/write heads 14$_2$, 14$_3$ to retrieve video and accompanying audio information therefrom. Furthermore, movement of any one of heads 14 by operation of its associated VCM servo control 94 and its dedicated voice coil motor 55 may be carried out without disturbing the reads and writes being performed by the other ones of heads 14.

Disk drive system 70 according to this first preferred embodiment of the invention may also be used in a low-power mode, where only a single read/write access is carried out by one of the read/write heads 14 at any one time. In this low-power mode, at most only standby current may be drawn through the ones of data channel controller circuits 92 and VCM servo controls 94 that are not associated with the active read/write head 14. According to the present invention, it is further contemplated that the access time of disk drive system 70 will be reduced from that of a conventional disk drive, because of the ability of actuator arms 52 to move from track to track during a read/write access associated with a stationary one of actuator arms 52, as will now be described.

Because of the separate operation of voice coil motors 55, voice coil motors 55 may be operated at different times from one another, to permit travel of one or more of read/write heads 14 to a different track during a read or write access by one or more others of read/write heads 14. This operation will now be described in further detail by way of an example of a sequence, over several intervals of time, of read and write operations by disk drive system 70 in the low-power mode (i.e., only a single one of read/write heads 14 active at any one time). As before, the particular time intervals may not be equal in duration, as depending upon the length of an access and a movement of one of actuator arms 52. An exemplary series of intervals is indicated as follows:

| Head | Interval 1 | Interval 2 | Interval 3 | Interval 4 | Interval 5 | Interval 6 |
|---|---|---|---|---|---|---|
| 14$_0$ | RD/WR | MOVE | — | — | RD/WR | MOVE |
| 14$_1$ | — | RD/WR | MOVE | MOVE | — | — |
| 14$_2$ | — | — | RD/WR | MOVE | — | RD/WR |
| 14$_3$ | — | — | — | RD/WR | MOVE | — |

In this example, each actuator arm 52 moves (MOVE) to a different track in the interval immediately following a read or write access (RD/WR). As indicated in intervals 3 and 4, by way of example, a move may be performed over multiple read/write intervals, particularly if a head must be moved from a far inside track to a far outside track. In addition, as indicated in interval 6, the particular order by way of which read/write heads 14 are selected is not critical, given the independent operation of data channel controller circuits 92 as described hereinabove. Furthermore, as is evident from all of the intervals in the above example, overall access time is improved over conventional individual head operation as a read/write access is being performed in each of the intervals. Because the moves of actuator arms 52 may be performed during a read or write at another one of heads 14, no intervals need be utilized solely for a move from track to track, as in the example noted above in the Background of the Invention. Furthermore, the accesses performed by the multiple ones of read/write heads 14 need not all be from the same track, given that actuator arms 52 are separately positionable by their dedicated voice coil motors.

In addition, disk drive system 70 according to this embodiment of the invention may be used in a degraded-performance mode. For example, if a disk "crash" occurs relative to one of the surfaces of one of disks 8 and its read/write head 14 is damaged, the remaining read/write heads 14 are fully operable to read and write data from all tracks of their respective surfaces, without requiring movement of the damaged read/write head 14. Such operation may also be utilized in the event of a failure of any of the dedicated electronics or voice coil motor 55 associated with one of the read/write heads 14.

Figure 8:
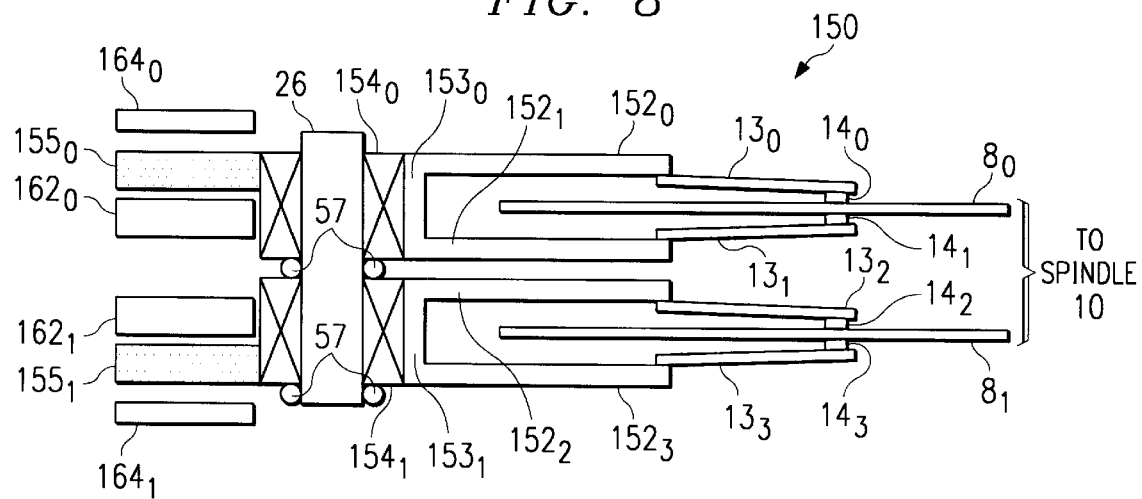
FIG. 8 is an elevation cross-sectional view of an actuator assembly according to a second embodiment of the invention.
Figure 9:
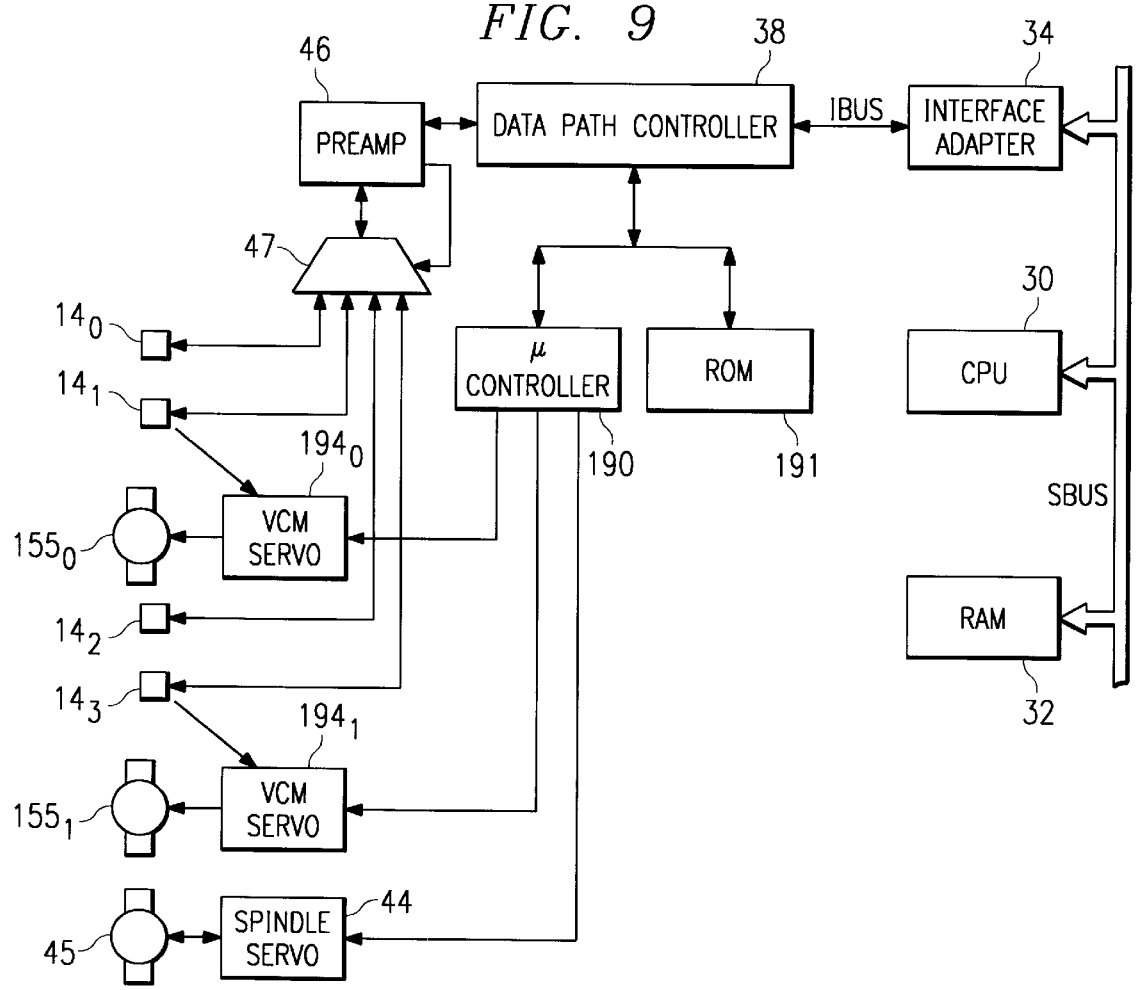
FIG. 9 is an electrical diagram, in block form, of data communications and drive control circuitry for the disk drive system according to the second embodiment of the invention.

Referring now to FIGS. 8 and 9, the construction and operation of circuitry used in operation of actuator assembly 150 according to a second preferred embodiment of the invention will now be described. Like elements in FIGS. 8 and 9 as described hereinabove are referred to by the same reference numerals.

As in the previously described embodiment, actuator arms 152 each have an associated flexure 13 attached at its distal end, with an associated read/write head 14 mounted at the distal end of the flexure. As illustrated in FIG. 8, actuator arms $152_0$, $152_1$ are joined together into E-block $153_0$, while actuator arms $152_2$, $152_3$ are joined together into E-block $153_1$. As such, actuator arms $152_0$, $152_1$, and their associated flexures $13_0$, $13_1$ and read/write heads $14_0$, $14_1$, are positioned at the same track, or radial position, of disk $8_0$ at all times; similarly, actuator arms $152_1$, $152_2$, associated flexures $13_2$, $13_3$, and read/write heads $14_2$, $14_3$, are positioned at the same track, or radial position, of disk $8_1$.

E-blocks $153_0$, $153_1$ each rotate about common pivot pin 26, by way of associated cartridge bearings $154_0$, $154_1$. Retaining rings 57 serve to properly position bearings $154_0$, $154_1$ at the desired height along pivot pin 26. E-blocks $153_0$, $153_1$ are attached to voice coil motors $155_0$, $155_1$, respectively, so that actuator arm pairs $152_0$, $152_1$, and $152_2$, $152_3$ may be separately positioned relative to one another. Each of voice coil motors 155 are constructed in the conventional manner, as a coil of conducting wire supported by a bracket, and are disposed between an associated magnet 162 and shield 164. Preferably, shield $164_0$ is disposed on the top of voice coil motor $155_0$, and shield $164_1$ is disposed beneath voice coil motor $155_1$, to best confine the magnetic fields; adjacent ones of voice coil motors 155 are also preferably counterwound relative to one another, as noted above. In this manner, voice coil motors $155_0$, $155_1$ may be operated independently from one another, to provide separate radial positioning of their respective read/write heads 14 relative to disks 8.

Referring now to FIG. 9, an example of the drive electronics for actuator assembly 150 according to this second embodiment of the invention will now be described in detail. In this embodiment of the invention, heads 14 are operated in the conventional manner, where only one of heads 14 is active at any one time. As such, the data path electronics for actuator assembly 150 are constructed in the conventional manner, with multiplexer 47 in communication with each of heads $14_0$ through $14_3$ and with preamp 46. Preamp 46 communicates data between the selected head 14 and data path controller 38, which in turn is in communication with interface adapter 34 over internal bus IBUS. Interface adapter 34 provides interface control to system bus SBUS, upon which CPU 30 and main memory 32 are resident.

According to this embodiment of the invention, microcontroller 190 and its program ROM 191 are coupled to data path controller 38, to receive track and spindle control signals therefrom. Microcontroller 190 forwards the appropriate spindle drive signals to spindle servo control 44 for control of spindle motor 45 in the conventional manner. According to this embodiment of the invention, microcontroller 190 also forwards track selection signals to VCM servo control $194_0$, which generates the appropriate drive current to voice coil motor $155_0$; similarly, microcontroller 190 communicates with VCM servo control $194_1$, which in turn generates the appropriate drive current to voice coil motor $155_1$. VCM servo controls $194_0$, $194_1$ are constructed in the conventional manner, for example as illustrated in FIGS. 7a and 7b, as suitable for independently controlling voice coil motors $155_0$, $155_1$.

According to this embodiment of the invention, actuator assembly 150 operates in low-power mode, with one of read/write heads 14 being selected at any one time through operation of multiplexer 47. The incorporation of multiple voice coil motors 155 along with multiple E-blocks 153 allows for improvement in disk access time, however, as one of E-blocks 153 may be positioning itself during such time as a read or write access is being performed by one of heads 14 on the other one of E-blocks 153. For example, a sequence of time intervals according to which actuator assembly 150 is operable is as follows:

| Head | Interval 1 | Interval 2 | Interval 3 | Interval 4 | Interval 5 | Interval 6 |
|---|---|---|---|---|---|---|
| $14_0$ | RD/WR | — | MOVE | — | RD/WR | — |
| $14_1$ | — | RD/WR | MOVE | — | — | RD/WR |
| $14_2$ | MOVE | — | RD/WR | — | MOVE | — |
| $14_3$ | MOVE | — | — | RD/WR | MOVE | — |

As apparent from the above example, no interval is consumed in moving heads 14 from track-to-track, as the rotational positioning of each E-block 153 may be done during an interval in which a read or write access is being performed at one of the heads 14 of the other E-block 153. As such, the performance benefit provided by actuator assembly 150 according to this second embodiment of the invention is also substantial.

According to each of the above-described embodiments of the invention, therefore, important performance improvements may be obtained in disk drive systems, particularly those used in connection with portable computers in which the form factor and weight of the disk drives is an important consideration, as the performance improvement is provided by the present invention without substantially increasing the volume or weight of the disk drives.

While the above embodiments of the invention are described relative to two-disk systems, with four read/write heads, it is of course to be understood that the present invention may be utilized in connection with other arrangements of disk drives, including those having more than two disks therein. Furthermore, it is contemplated that the various electronic circuitry for controlling the drive and data communication of the disk drive systems may be implemented according to a wide range of realizations, especially in obtaining the benefit of multimedia data access simultaneously with data access for numerical and other data processing applications.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. An actuator assembly for a hard disk drive having a plurality of disks, comprising:
    a pivot pin having a common pivot axis;
    a plurality of actuator arms, each rotatable about a common pivot axis independently from another one of the plurality of actuator arms;
    a plurality of bearings, each coupled to an associated one of the plurality of actuator arms and disposed about the pivot axis;
    a plurality of retaining rings, each coupled to an associated one of the plurality of bearings;

a plurality of read/write heads, each mounted at a distal end of an associated one of the actuator arms, for reading and writing data on surfaces of the plurality of disks; and a plurality of voice coil motors, each attached to at least one of the plurality of actuator arms, each for controllably rotating its attached actuator arm about the pivot axis.

2. The actuator assembly of claim 1, further comprising:

a pivot pin, disposed within each of the plurality of bearings, and having a longitudinal axis corresponding to the pivot axis; and means for positioning each of the plurality of bearings at an axial position along the pivot pin.

3. The actuator assembly of claim 2, further comprising:

means for positioning each of the plurality of bearings at an axial position along the pivot pin.

4. The actuator assembly of claim 1, wherein a first group of the plurality of actuator arms are fixably joined together near the pivot axis, the first group of actuator arms attached to a first one of the plurality of voice coil motors.

5. The actuator assembly of claim 4, wherein a second group of the plurality of actuator arms are fixably joined together near the pivot axis, the second group of actuator arms attached to a second one of the plurality of voice coil motors.

6. The disk drive system of claim 5, wherein first and second ones of the plurality of actuator arms are fixably joined together near the pivot axis, and are attached to a first one of the plurality of voice coil motors.

7. The disk drive system of claim 6, wherein first and second ones of the plurality of read/write heads are associated with the first and second ones of the plurality of actuator arms, respectively;

and wherein the first and second ones of the plurality of read/write heads are disposed adjacent first and second sides, respectively, of a first one of the plurality of disks.

8. The disk drive system of claim 6, wherein third and fourth ones of the plurality of actuator arms are fixably joined together near the pivot axis, and are attached to a second one of the plurality of voice coil motors.

9. The disk drive system of claim 8, wherein first and second ones of the plurality of read/write heads are associated with the first and second ones of the plurality of actuator arms, respectively;

wherein third and fourth ones of the plurality of read/write heads are associated with the third and fourth ones of the plurality of actuator arms, respectively;

wherein first and second ones of the plurality of read/write heads are associated with the first and second ones of the plurality of actuator arms, respectively, and are disposed adjacent first and second sides, respectively, of a first one of the plurality of disks;

and wherein third and fourth ones of the plurality of read/write heads are associated with the third and fourth ones of the plurality of actuator arms, respectively, and are disposed adjacent first and second sides, respectively, of a second one of the plurality of disks.

10. A disk drive system for a computer, comprising:

a spindle;

a plurality of magnetic disks rotatable about the spindle;

a spindle motor for rotating the magnetic disks;

an actuator assembly, comprising:

a plurality of actuator arms, each rotatable about a common pivot axis independently from another one of the plurality of actuator arms;

a plurality of bearings, each coupled to an associated one of the plurality of actuator arms and disposed about the pivot axis;

a plurality of retaining rings, each coupled to an associated one of the plurality of bearings;

a plurality of read/write heads, each mounted at a distal end of an associated one of the actuator arms so as to be proximate a surface of an associated one of the plurality of disks;

a plurality of voice coil motors, each attached to at least one of the plurality of actuator arms, each for controllably rotating its associated at least one actuator arm about the pivot axis; and a plurality of magnets, each disposed adjacent one of the voice coil motors, for generating a magnetic field within which its associated voice coil motor is disposed;

a plurality of voice coil motor control circuits, each associated with one of the plurality of voice coil motor, for controlling the radial position of the attached actuator arm and its associated at least one of the plurality of read/write heads relative to its associated disk; and data communication circuitry, for communicating read and write signals to and from the read/write heads.

11. The disk drive system of claim 10, further comprising:

a microcontroller for controlling the operation of the plurality of voice coil motor control circuits responsive to signals received from a bus.

12. The disk drive system of claim 10, further comprising:

a plurality of shields, each disposed adjacent one of the plurality of voice coil motors, for confining the magnetic field generated by the one of the plurality of magnets associated with the voice coil motor.

13. The disk drive system of claim 10, wherein each of the voice coil motors is disposed between two of the plurality of magnets.

14. The disk drive system of claim 10, wherein first and second ones of the plurality of read/write heads are associated with the first and second ones of the plurality of actuator arms, respectively;

wherein the first and second ones of the plurality of read/write heads are disposed adjacent first and second sides, respectively, of a first one of the plurality of disks;

and wherein first and second ones of the plurality of voice coil motors are attached to the first and second ones of the plurality of actuator arms, respectively.

15. The disk drive system of claim 10, wherein the data communication circuitry comprises:

a plurality of preamplifiers, each associated with one of the plurality of read/write heads, for generating write signals to its associated read/write head and for receiving read signals therefrom;

data channel control circuitry, for communicating signals between a bus and the plurality of preamplifiers.

16. The disk drive system of claim 10, wherein the data communication circuitry comprises:

a preamplifier for generating write signals to a selected one of the plurality of read/write heads and for receiving read signals therefrom; and data channel control circuitry, for communicating signals between a bus and the preamplifier.

17. A method of operating a hard disk drive system in a computer, the hard disk drive including a plurality of disks, and including an actuator assembly having a plurality of actuator arms, each rotatable about a common pivot axis independently from another one of the plurality of actuator arms, which comprises:

A. a first mode including the steps of:
   i. performing a first disk access operation by a first read/write head disposed at a distal end of a first one of the plurality of actuator arms, the first read/write head disposed over a track of a first one of the plurality of disks, and
   ii. during the step of performing a first disk access operation, performing a second disk access operation by rotating a second one of the plurality of actuator arms about the common pivot axis, the second one of the plurality of actuator arms having a second read/write head at a distal end thereof, the rotating step operating to move the second read/write head from over a first track of one of the plurality of disks to over a second track thereof;

B. a second mode comprising the steps of:
   i. performing a first disk access operation by a first read/write head disposed at a distal end of a first one of the plurality of actuator arms, the first read/write head disposed over a track of a first one of the plurality of disks, and maintaining the others of the plurality of actuator arms inactive, and
   ii. sequencing through performing a disk access operation for each of the plurality of actuator arms while maintaining the others of the plurality of actuator arms inactive.

18. The method of claim 17, further comprising:

during the step of performing a first disk access operation, performing a second disk access operation via a third read/write head disposed at a distal end of a third one of the plurality of actuator arms, the third read/write head disposed over a track of one of the plurality of disks.

19. The method of claim 17, wherein the second read/write head is disposed near a surface of a second one of the plurality of disks.

20. The method of claim 17, further comprising:

prior to the step of performing a first disk access operation, selecting the first read/write head for communication with a preamplifier;

after the rotating step, selecting the second read/write head for communication with the preamplifier and deselecting the first read/write head for communication therewith; and after the step of selecting the second read/write head, performing a second disk access operation via the second read/write head.

21. The method of claim 20, wherein the second read/write head is disposed near a surface of a second one of the plurality of disks.

* * * * *